Figure 1:
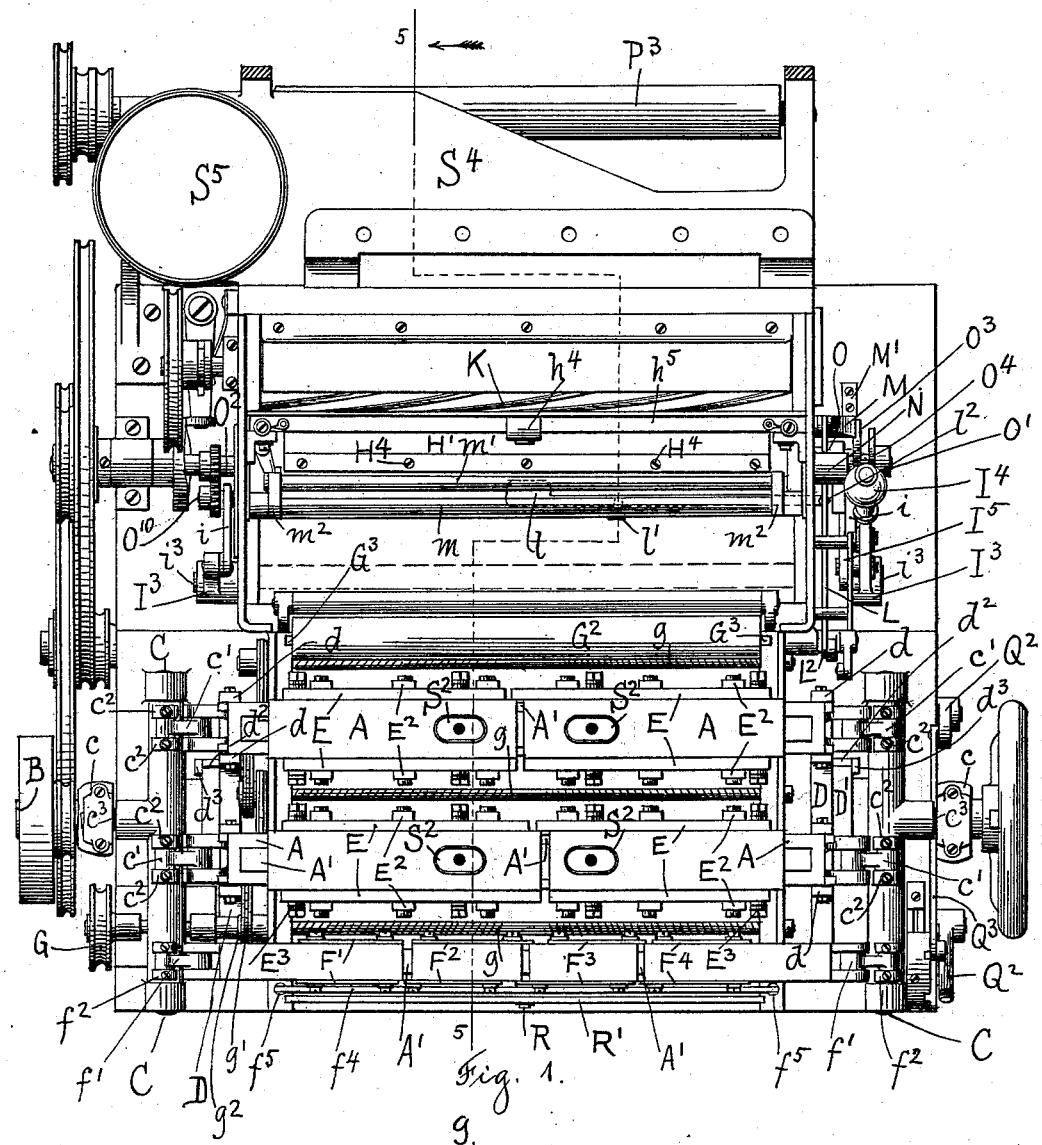

(No Model.) 11 Sheets—Sheet 1.

C. H. WILLCOX & J. RANGE.
MACHINE FOR CLIPPING LACE.

No. 524,924. Patented Aug. 21, 1894.

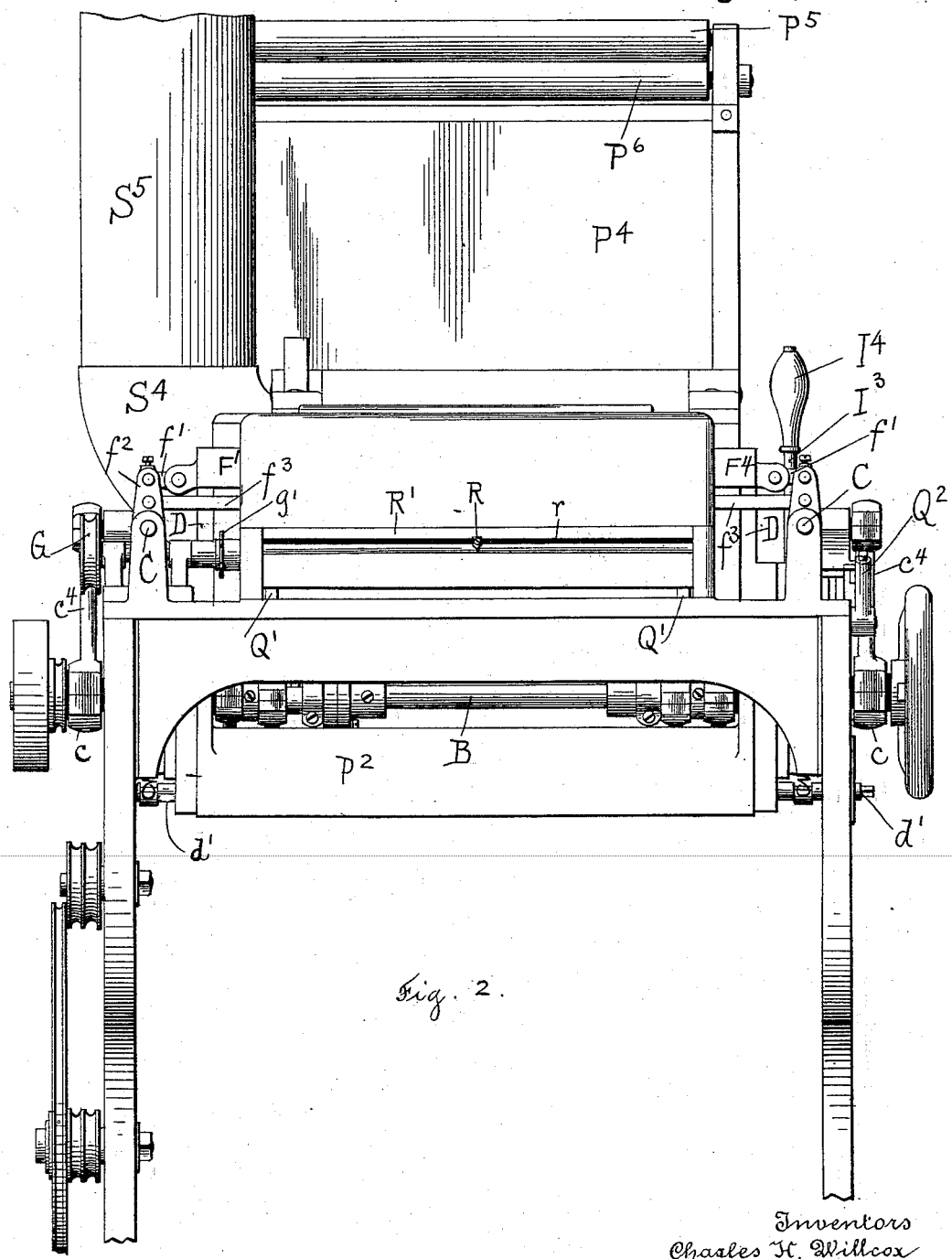

(No Model.) 11 Sheets—Sheet 4.

C. H. WILLCOX & J. RANGE.
MACHINE FOR CLIPPING LACE.

No. 524,924. Patented Aug. 21, 1894.

Witnesses
C. F. Schmelz
Pearl Lewis

Inventors
Charles H. Willcox,
James Range,
By Attorneys

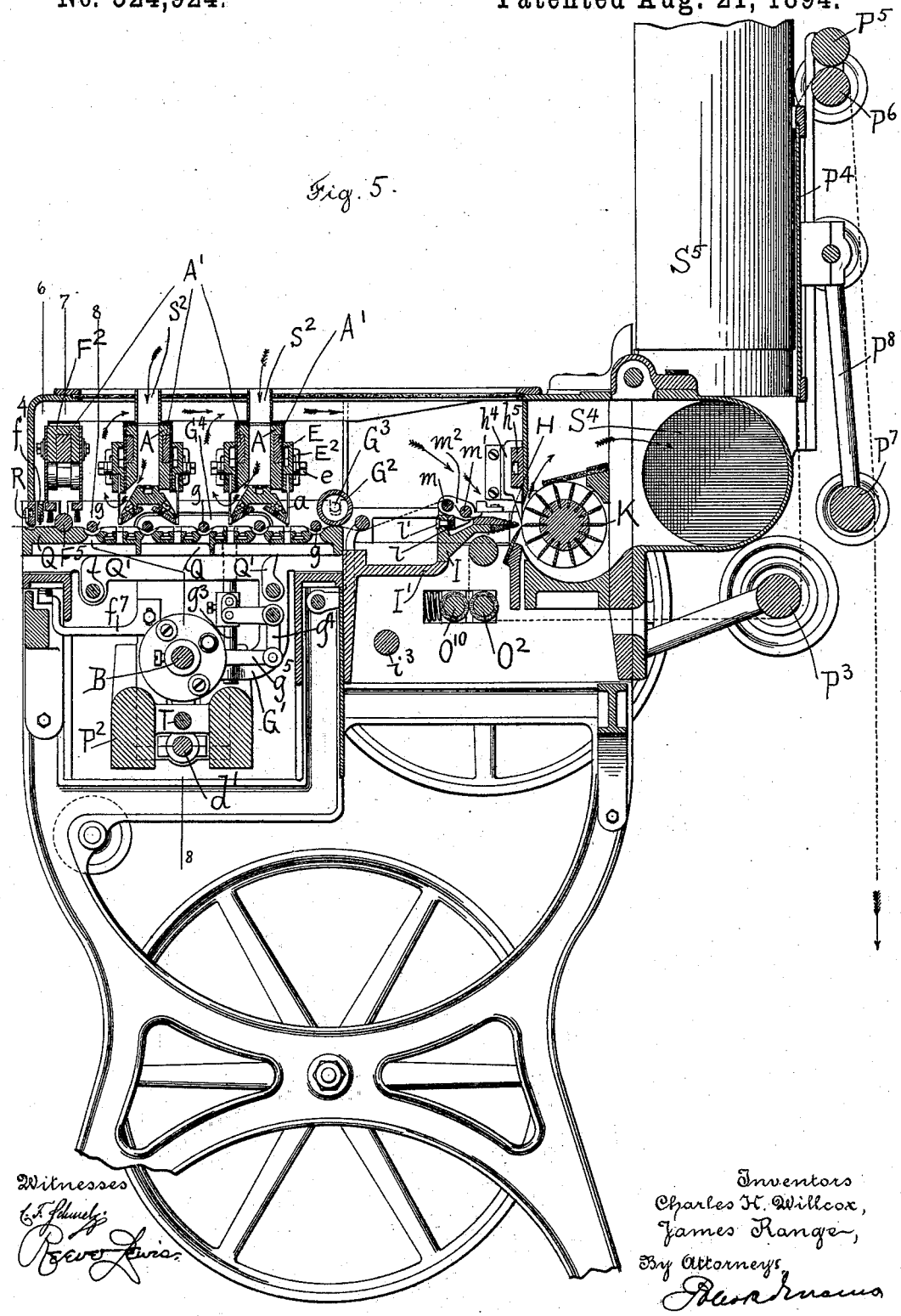

(No Model.) 11 Sheets—Sheet 6.
C. H. WILLCOX & J. RANGE.
MACHINE FOR CLIPPING LACE.
No. 524,924. Patented Aug. 21, 1894.
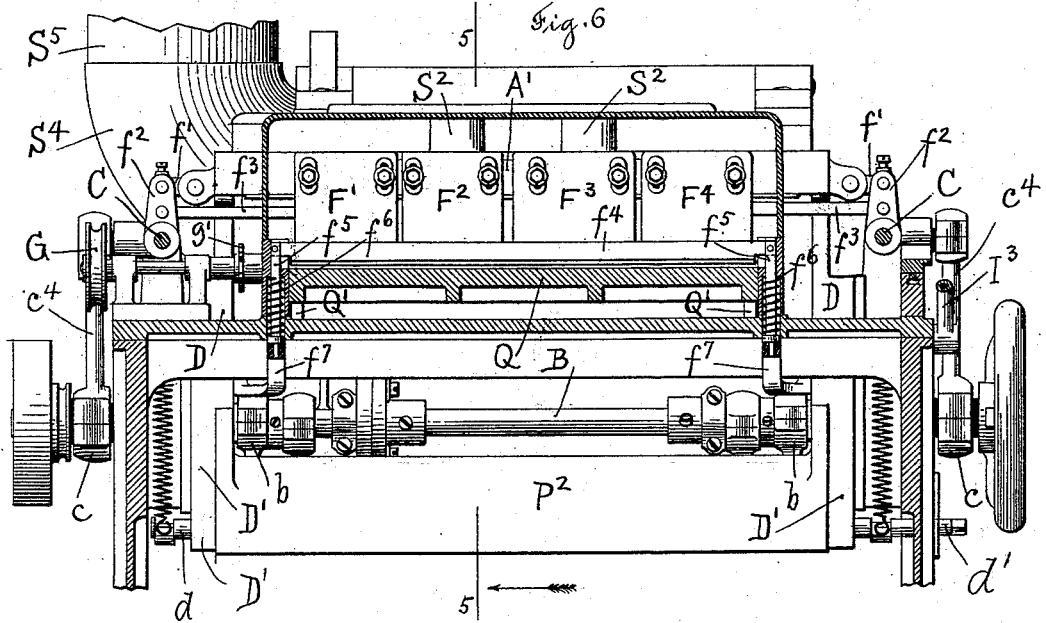
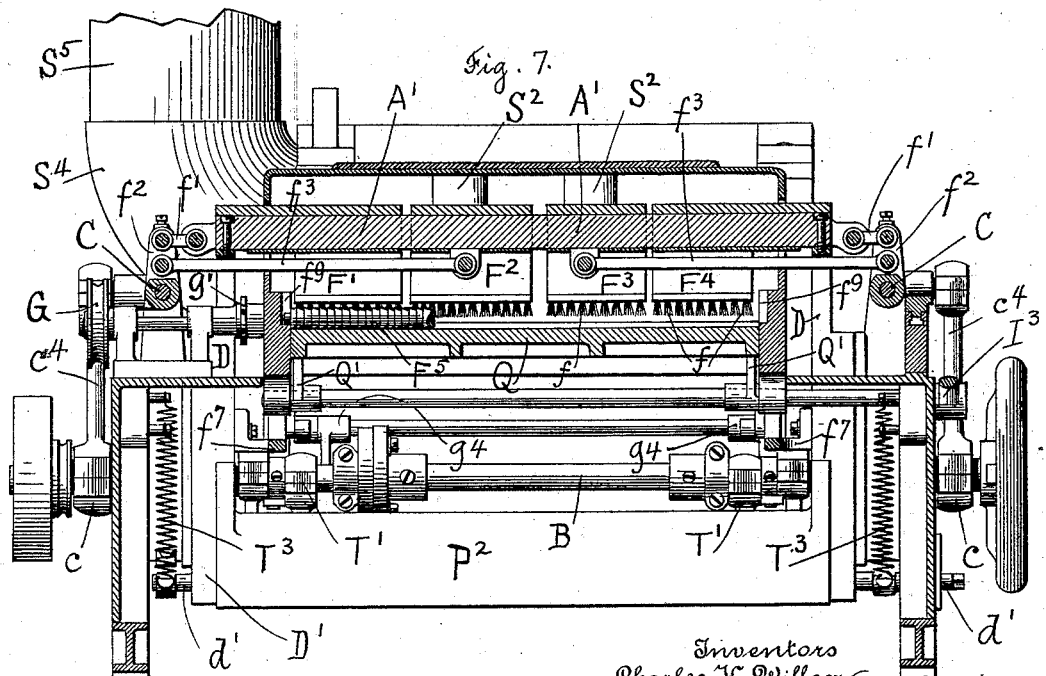
Witnesses
Chas. F. Schmelz
Reeve Lewis
Inventors
Charles H. Willcox
James Range
By Attorneys
Pollok & Mauro

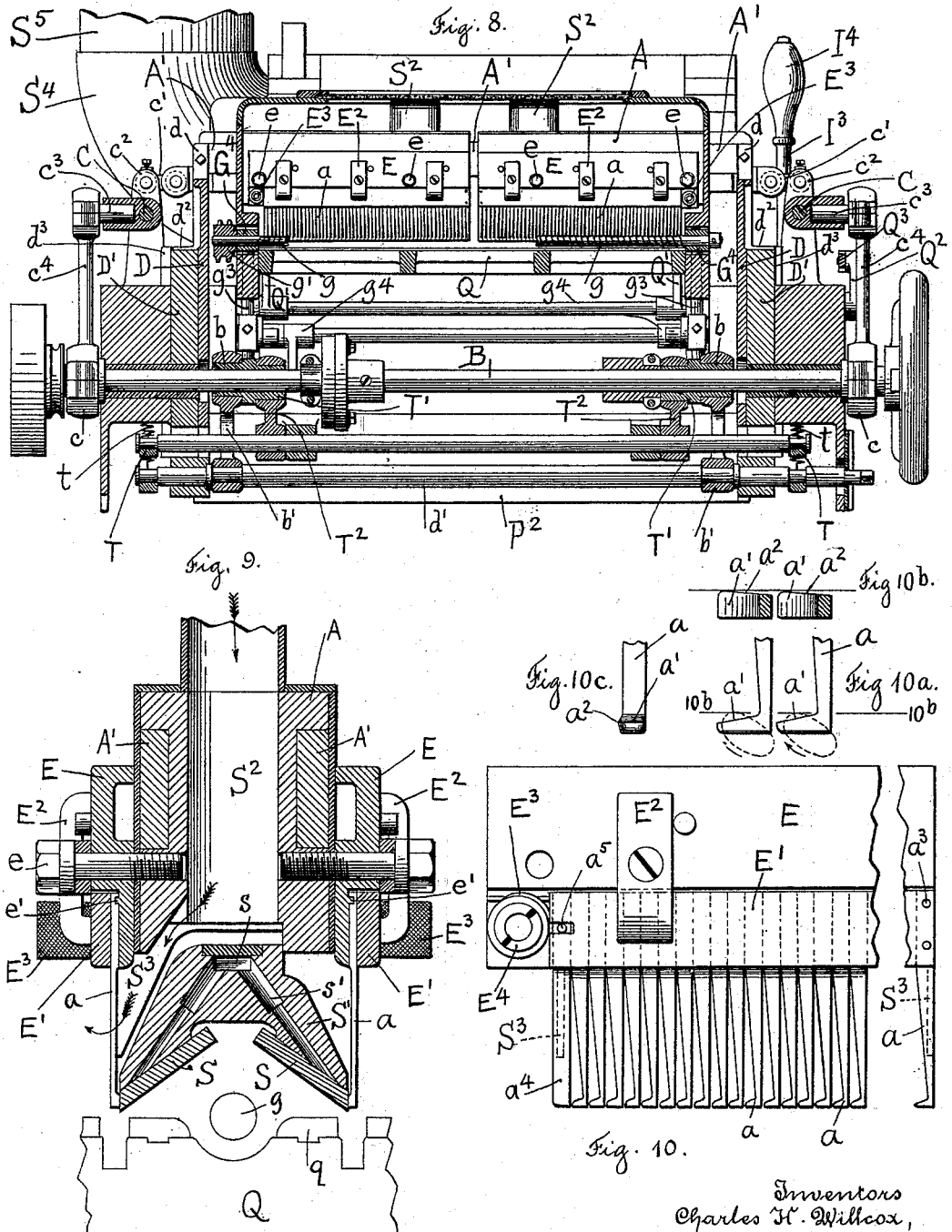

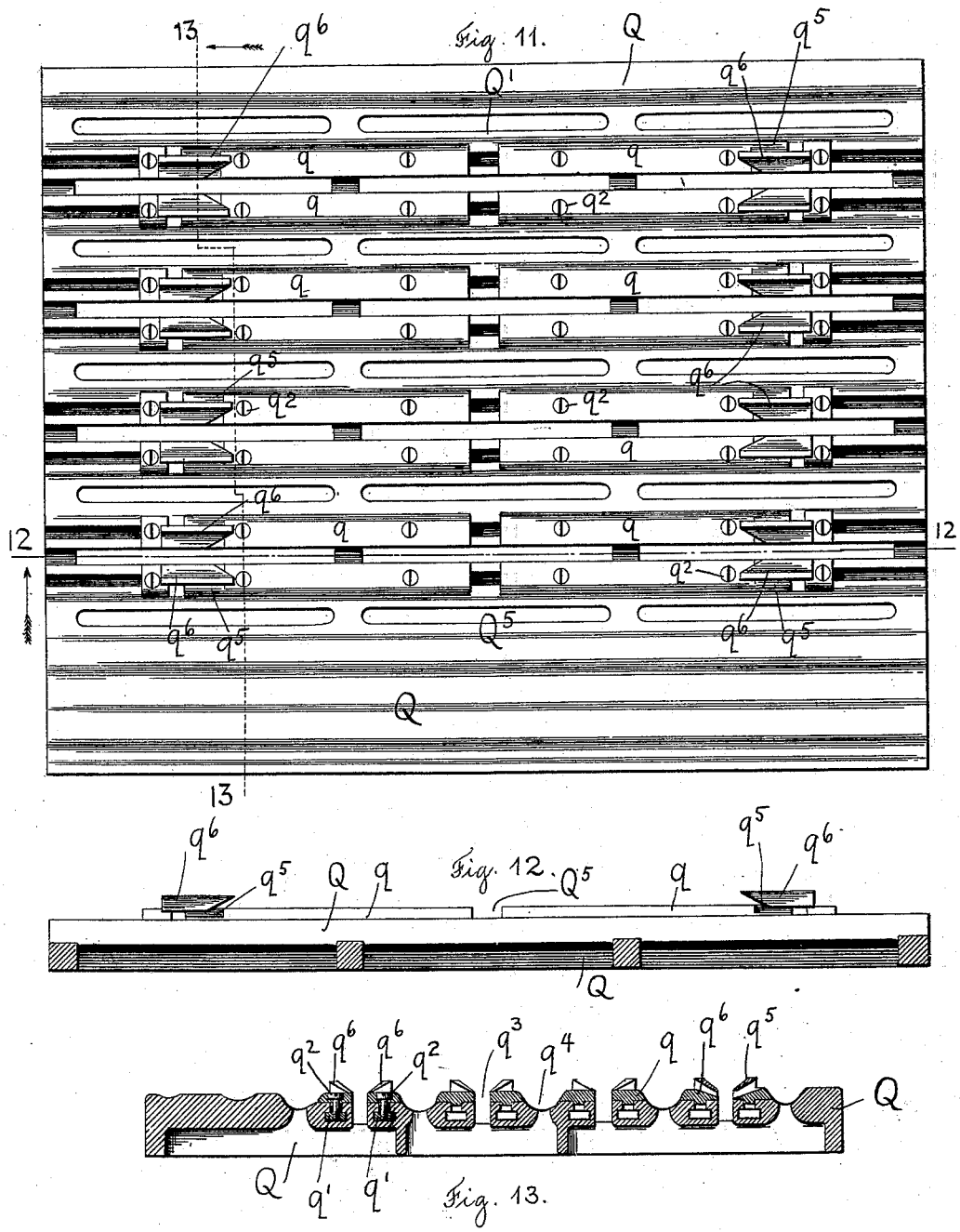

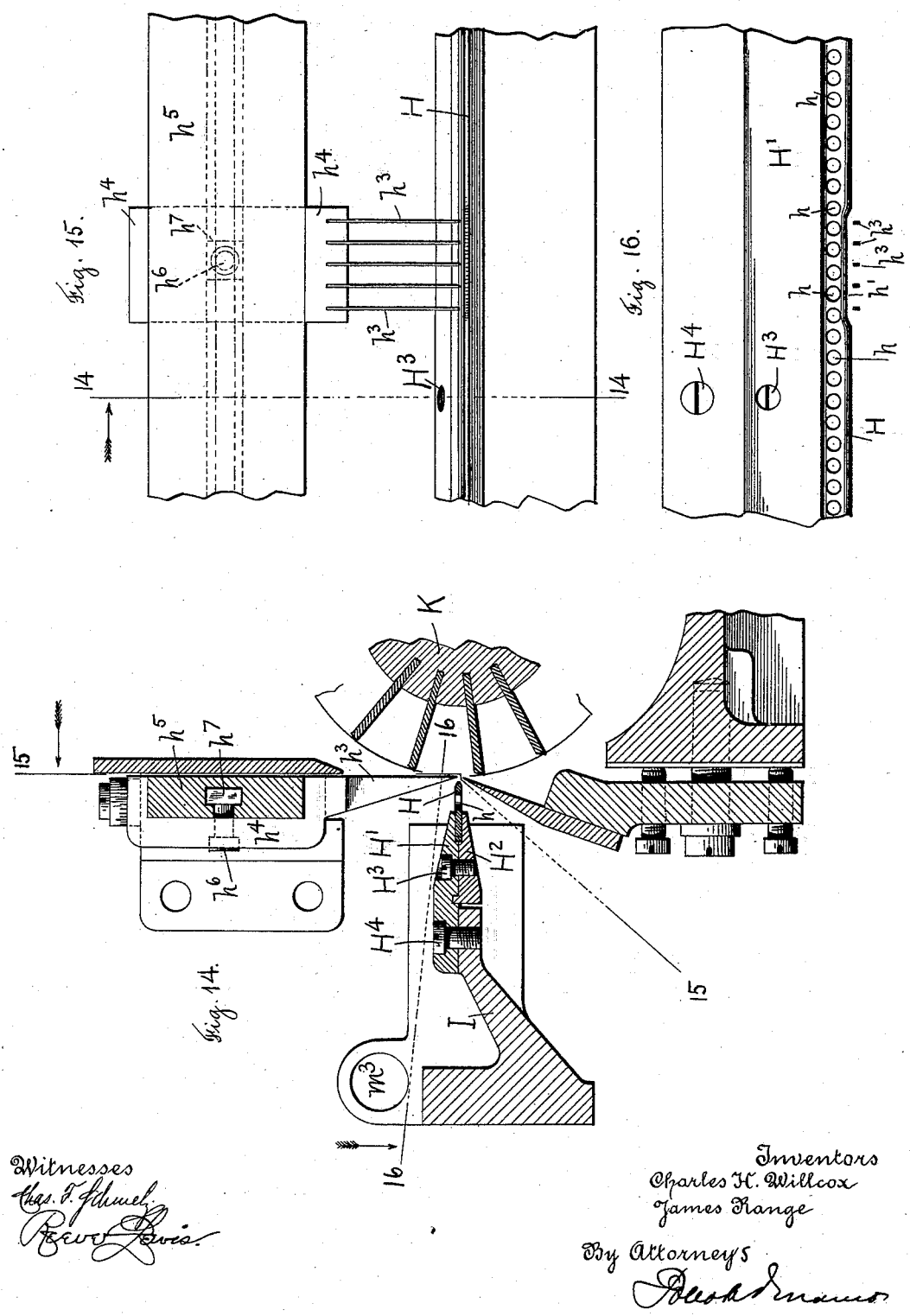

(No Model.) 11 Sheets—Sheet 10.
C. H. WILLCOX & J. RANGE.
MACHINE FOR CLIPPING LACE.
No. 524,924. Patented Aug. 21, 1894.
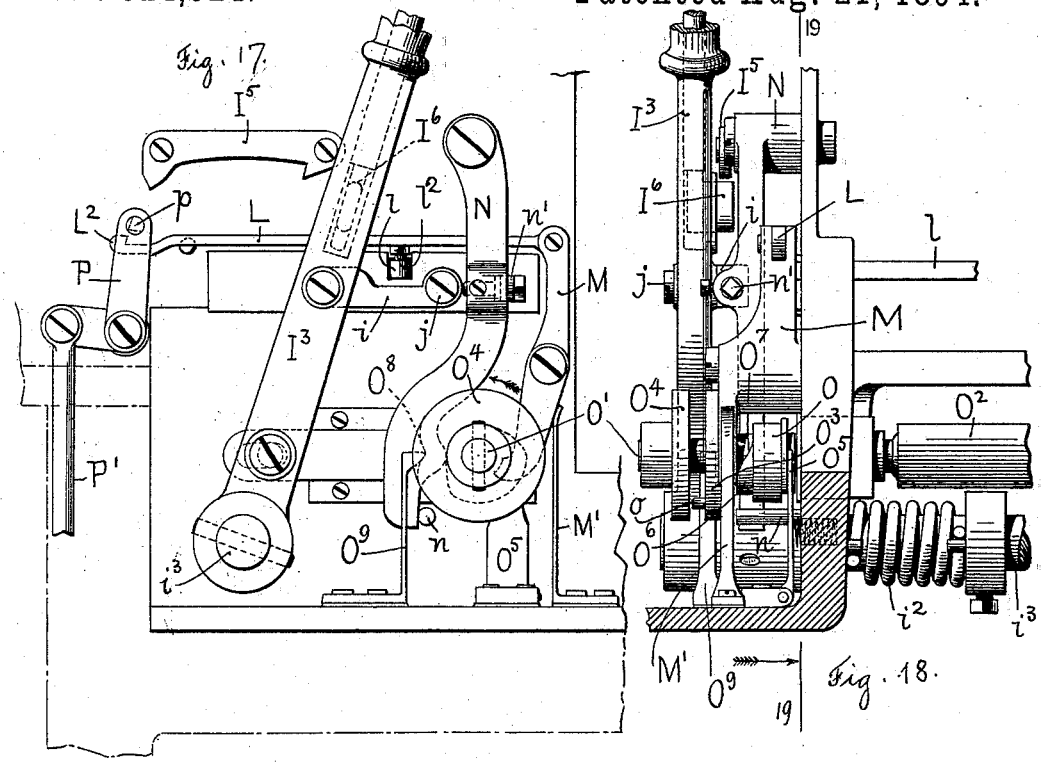
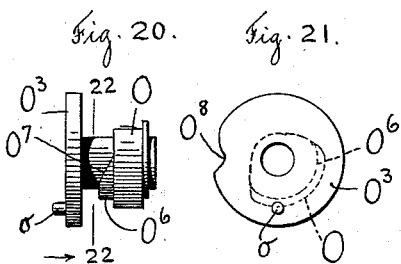
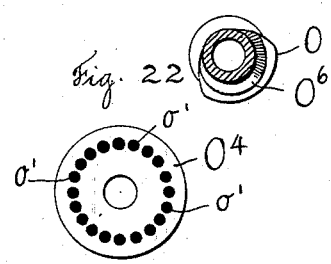
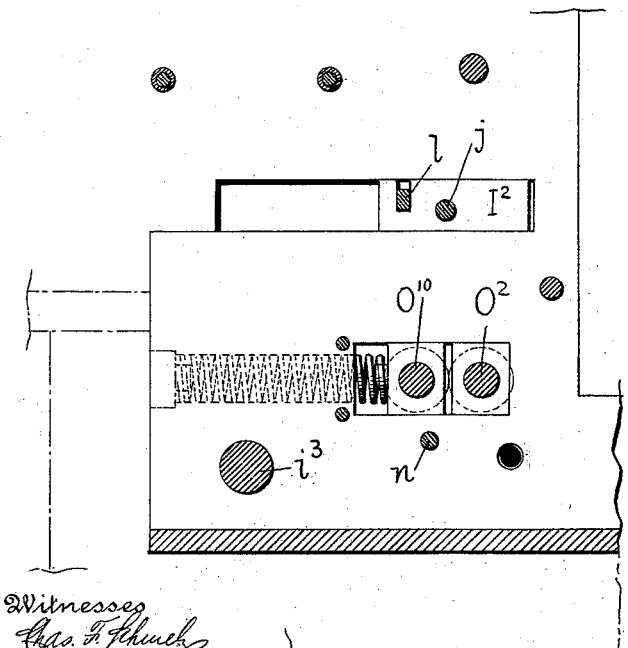
Witnesses
Inventors
Charles H. Willcox
James Range
By Attorneys (No Model.) 11 Sheets—Sheet 11.

C. H. WILLCOX & J. RANGE.
MACHINE FOR CLIPPING LACE.

No. 524,924. Patented Aug. 21, 1894.

Witnesses

Inventors
Charles H. Willcox
James Range
By Attorneys

UNITED STATES PATENT OFFICE.

CHARLES H. WILLCOX, OF NEW YORK, N. Y., AND JAMES RANGE, OF NOTTINGHAM, ENGLAND, ASSIGNORS TO THE WILLCOX & GIBBS SEWING MACHINE COMPANY, OF NEW YORK, N. Y.

MACHINE FOR CLIPPING LACE.

SPECIFICATION forming part of Letters Patent No. 524,924, dated August 21, 1894.

Application filed February 1, 1893. Serial No. 460,577. (No model.) Patented in England December 24, 1892, No. 23,846.

*To all whom it may concern:*

Be it known that we, CHARLES H. WILLCOX, of New York city, in the county and State of New York, and JAMES RANGE, of Nottingham, England, have invented a new and useful Improvement in Machines for Clipping Lace, which improvement is fully set forth in the following specification, and for which British Patent No. 23,846, dated December 24, 1892, has been obtained.

This invention has reference to machines for clipping lace of the same general character as described in United States Letters Patent No. 353,615, dated November 30, 1886, and No. 361,563, dated April 19, 1887; and the said invention comprises certain improvements in machines of this class, which improvements, together with the objects thereof, will be fully described herein.

First. Heretofore the pickers were carried upon bars which overhang the lace-plate, and extend half-way across the same, meeting similar picker-carrying bars extending from the opposite side. This construction is suitable, and even preferable for machines of comparatively small width, but is inapplicable to machines designed to act upon very wide pieces of lace, owing to the springiness of the bars, which if extended in length beyond a reasonable point, would at high speeds develop a tendency to "whip" and cause variations in the stroke of the pickers. By means of the present invention, lace clipping machines of any desired width can be constructed and to this end the pickers are carried upon slides or sleeves, mounted upon a bar or bars, bridging the entire width of the machine, and of sufficient strength for the purpose in view. These bars in turn rest upon slides which work in guides fitted to the frame of the machine at each side, these guides being given a vertical movement by means of suitable connecting rods and eccentrics, or other actuating devices. The horizontal sleeves or slides (of which there are two for each two lines of pickers) extend half-way across the machine and meet almost at the center. They are given the necessary reciprocating movements toward and away from each other by means of suitable actuating devices such as bell cranks connected with eccentrics on the main-shaft. The pickers may be attached directly to the sleeves or slides, or they may be clamped to detachable plates, which are in turn secured to the sleeves or slides. The latter arrangement is preferred.

Second. In order to assist in keeping the lace stretched out to its greatest width and at the same time loosen the floats or clips from the body of the net preparatory to their being picked up and cut by the cutting pickers, brushes are provided which are given the same movement as the pickers; that is, they brush from the center outward toward the edges of the lace. In the construction for the wide machine, these brushes are clamped to and carried by sleeves, the same as the pickers; but in the narrow machine, they may be carried by bars in the same manner as the pickers are carried.

Third. Just inside of the cover and before the lace arrives at the brushes, it passes under a vertically acting clamp (preferably having a strip of rubber inserted in its lower edge) which clamp during the operation of the brushes presses by spring pressure upon the lace, but is caused to rise automatically and release the lace when the time comes for feeding the lace into the machine.

Fourth. Between the two lines of brushes a roller is placed, having in its circumference ratchet shaped grooves, *i. e.* grooves which are vertical on one side and inclined on the other. The vertical faces of these grooves are at each side turned away from the center of the machine. The roller is journaled in vertical grooves in the side walls of the machine and rests in action upon the lace, which is supported by the lace-plate, thus giving it a slight tension and holding it extended as the brushes act upon it. The slots in which the journal pins move extend downward a little below the under side of the journal pins so that the roll may always rest upon the lace (which is supported by the lace-plate) and the slots terminate at a point just below, so that when the lace-plate is lowered to allow the lace to be inserted in the machine, the roller remains suspended.

Fifth. The lace in its continued progress through the machine passes under a series of rollers having spiral ratchet shaped grooves, which rollers are journaled in the sides of the machine, or in vertically acting guides, or bearings. These rollers are cut on one or both sides of the center with spiral threads, the vertical face of the threads being toward the outside of the machine at either side. These rollers are given a constant rotary movement by suitable connection with the main shaft, and turn in such direction that the under side of the rollers moves in an opposite direction to the feeding of the lace through the machine; and the screw threads are cut in such direction that they tend to spread the lace as they turn in contact with it, and as the lace is fed through the machine. These rollers are sometimes made with the screw only on one side of the center, being cut on the other side with ratchet grooves encircling the rollers at right angles to their axes. In this case such portions of the rollers only act to keep the lace extended at that side of the center of the lace-plate. This construction is desirable when the machine is acting upon lace on the edges of which is a "head" composed of heavy threads, forming the pattern while at the other edge of the lace there is little but the net or ground work of the lace. It is desirable in this case only to spread this edge of the lace, while allowing the "head" of the lace to pass through the machine without action by the rolls except to hold against the spreading action of the spiral portion of the roll. In some cases also the ratchet thread may be on both sides of the center, but on one side it will be a single threaded screw, while on the other a double threaded screw. These various combinations can be made by merely changing the rollers as required. These rollers act in grooves, or their equivalents, cross-wise of the lace-plate of the machine, the lace always passing in a bent or corrugated form through the machine so as to give the rolls an opportunity to spread or hold the lace. As before stated, some or all of these rollers may be simultaneously moved in guides or bearings, having a vertical movement opposite to that of the pickers, so that when the pickers are up and clear of the lace, the rollers will be depressed still further into the grooves in the lace-plate, while when the pickers are depressed on the lace, the rolls will occupy relatively a higher position. The effect of this movement of the rollers is alternately to draw more lace through the machine and then give it up again as the pickers descend upon it, which in the case of delicate lace relieves it from undue strain caused by the pickers depressing it into the picker grooves in the lace-plate.

Sixth. The lace in its further passage through the machine passes through a device which is intended to give sufficient tension on the lace and cause it to bend sharply over the edge of the throat plate, so as to present the split ends of the clips or floats in proper position to be moved off by the rotary cutter. This tension device preferably consists of a roller of proper weight, turning in vertical grooves in the side walls of the machine, and pressing the lace between itself and any stationary part of the machine—such as the lace-plate itself—but any usual or suitable construction for imparting friction or tension could be used. This tension, as it will be seen, is placed after the pickers have completed their work upon the lace and before it reaches the mowing mechanism, as at this time, whatever tension is necessary to produce perfect mowing can be applied to the lace without interfering with the proper action of the pickers, which demand a lighter tension upon the lace as it passes under them.

Seventh. It is desirable in passing lace through the machine that it should be first sewed together into continuous strips of sufficient length to avoid stopping the machine frequently to insert new pieces of lace, and this is done by making an ordinary seam, uniting the ends of the various strips. As the seams pass through the machine and reach the mowing mechanism, unless the throat-plate is withdrawn by the operator at the right moment to permit the seam to pass through freely, it will, because of the extra thickness at the seam, be cut off by the mowing mechanism, and the strips separated. To overcome this difficulty, an automatic setting-off device is introduced into the machine, by which, as the lace passes between a stationary portion of the machine and a delicate lever, which always rests upon it, the additional thickness of the fabric sets in action proper mechanism to move the throat-plate away from the mowing mechanism and to return it as soon as the seam has passed the edge of the throat-plate. While the setting-off device is necessarily delicate in its operation, it brings into action moving parts of the mechanism, which act with all necessary power to produce the movement of the throat-plate with certainty and at the proper time.

Eighth. The lace, after being mowed passes downward and under the block in which the rotary cutter is journaled and thence under a roller and upward in front of a display-plate of card-board or sheet metal, either white or colored, as best adapted to allow the pattern of the lace to be seen by the operator. The lace is caused to move in this upward direction by suitable means, such as a moving roller, upon which a weighted roller presses; and thence it is or may be passed over another roller supported on arms extending from the back of the machine; all the rollers being given a rotary movement in the right direction by suitable belting from the moving parts of the machine. The lace, after passing the final roller, falls into a basket or other receptacle. This last roller is extended some distance from the back of the machine in order to give room for a basket to be placed there, and also to prevent silk lace being drawn by electrical action against the frame of the machine.

Ninth. Lace, as commonly made, has a "back" or selvage on either or both edges. This selvage or "back" is composed of straight threads, which are generally heavier than the thread from which the "net" is made. The "net" threads pass around the "back-threads" and unite them to the body of the "net." In order to prevent this "back" or selvage being picked up and cut by the cutting pickers, it has been found necessary to support the lace upon a surface or surfaces of less width than the width of the lace, and raised above the general surface of the lace-plate, so as to allow the two edges of the lace to be depressed below this raised surface by means of the rotating grooved rollers or their equivalent. Wherever the strip of lace to be clipped consists of two or more breadths of lace united by the "draw threads" these raised surfaces must be of the right width and in the right position to support each breadth of lace within the salvege or scalloped edge line. This, in effect, will form grooves or depressions in the lace-plate, lengthwise of the lace, the middle of each groove being in line with the "back" or selvage of each breadth of lace. These raised surfaces may be formed in various ways. Preferably they are formed by using strips of varying lengths, adjustably attached to the upper surface of the lace-plate, which, in case the lace is wide enough to almost fit the machine, are long enough to be nearly the width of the lace, or in case several strips of lace, still united by their "draw-threads" are being passed through the machine, then these adjustable strips will be of the proper length for each breadth of lace, but always less than the width of the lace. Consequently a space or spaces will be left between the ends of these strips into which the "backs" or selvages are depressed by the ratchet rollers or their equivalent, before referred to, and are kept clear of the action of the pickers. It is seldom that the pattern on the lace extends quite to the selvage edge, consequently it is only necessary to have the adjustable strips hold the lace up to be acted upon by the pickers, where there are clips or floats to be removed. These adjustable strips are used on both sides of the lines of pickers, and thus form the grooves into which the lace is depressed by the pickers in picking and cutting the floats or clips. In practice these raised surfaces are preferably secured to the upper plane surface of the lace-plate by a tongue on the under side of the strip entering a groove in the lace-plate, through which screws enter nuts sliding in T-grooves extending across the plate under each line of strips. By this means these adjustable strips may be accurately adjusted and readily changed as required. Each of these adjustable strips is preferably rounded on one edge and forms the surface over which the lace is depressed by the spreading rollers or their equivalent. By substituting lace-plates, in which the grooves for adjustable strips vary in distance from the center of the picker slots or grooves, any desired distance between the edges of the strips adjacent to the pickers (in other words picker-grooves of any desired width) can be secured, while still using the same adjustable strips. In practice it is found desirable to have these plates, giving various widths of picker grooves, to accommodate different styles and designs of lace.

Tenth. In order to continue the spreading action of the spiral ratchet rollers to the extreme edge of the outside selvage or selvages, some of these adjustable strips are made sufficiently long to allow the selvage edge to rest clear to the edge of the lace on the adjustable strips, but they are cut away on a bevel toward the edge forming the picker grooves, so as to allow the "back" or selvage to be depressed below the general upper surface of the strips by means of overhanging guides or fingers. These guides or fingers extend inward and over the bevel of the adjustable strips and the under surface of the projecting part of the guides or fingers is a little below the general upper surface of the strips. They approach as closely as may be to the shoulder or corner formed by the bevel and still permit the lace to pass freely. As these fingers are or may be adjustably secured to the lace-plate in the same manner as the adjustable strips and are or may be on both sides of the lines of pickers, it follows that the selvage edge or "back" is held safely below the action of the pickers and still the spreading action of the ratchet rolls is secured to the extreme edge of the lace. These depressing guides or fingers can be used on either or both edges of the strips of lace.

Eleventh. The throat-plate or the plate over which the lace is bent in order to throw out the severed clips or floats for the action of the rotary cutter, is preferably provided with or formed of a thin sheet metal strip clamped between the stationary part of the throat-plate and the movable clamp. This strip projects far enough beyond the point where it is clamped to its support to allow holes to be drilled or punched through it close to the edge over which the lace is being drawn. These holes allow air to be drawn through the lace by means of the air exhauster, which is connected to the machine for the purpose of removing the severed clips. The air so passing through the lace tends to lift up the severed ends of the clips or floats as they approach the edge of the throat plate and assist in presenting them in proper position to be mowed off by the rotary cutter. In order to compel the air to pass through the perforated plate strip and also to produce the suction through the lace-plate, as provided in our former patent (No. 361,563), the machine is made as nearly air tight as possible except at the points where it is arranged for the air to enter.

Twelfth. As the pattern or figure upon lace is often very much heavier than the general thickness of the "net" from which the body of the lace is formed, it follows that in passing the lace over a straight throat-plate, the thick portion comes too near to the cutter before the thinner portions of the lace approach near enough to allow the ends of clips being mowed closely to the fabric. To compensate for this condition we cut away the edge of the throat-plate strip, where the thick portion of the lace comes, sufficiently to allow that part of the lace to be held farther from the rotary cutter than it otherwise would be. The amount and position of this cutting away of course varies in different kinds and patterns of lace, so that ability to quickly and cheaply change the edge of the throat-plate by the use of sheet-metal strips is of much importance.

Thirteenth. In order to insure the protection of the thick portion or pattern of the lace, we have combined with the throat-plate, a guard, which is preferably in the form of a section of a comb, and we may employ one or more such guards, according to the requirements of different patterns of lace. We make the combs in sections of different lengths and adjustably secure them to the comb-bar in any desired position by means of a screw and nut working in a T-groove in the comb-bar. By placing a comb of the proper width opposite the portion of lace requiring protection and opposite the cutaway portion of the throat-plate strip, as provided above, when that is used, the safety of the lace is assured at this point, and the rest of the lace not requiring the comb, will be more perfectly cleared. In place of the comb a solid shield of the same section as the comb may be substituted, where the part of the lace sought to be protected has no clips.

Fourteenth. At the point where the pickers bear against the stationary blades, which cooperate with the pickers in severing the clips or floats, it is necessary that a small quantity of oil be provided, and it is desirable that this be done in such manner as to insure its being constantly supplied in about the right quantity. To accomplish this, we form one or more reservoirs in the upper part of the bridge to which the stationary picker blades are attached, and from this reservoir, or reservoirs, we convey the oil to the upper inclined surfaces of the blades, which are adjustably secured to the under side of the bridge. The oil by this arrangement, exudes from the joints between the bridge and the blades and runs down on the surfaces against which the pickers bear. The oil is thus supplied in theoretically the best place for doing the work and there is no surplus oil to soil the lace, as all that is not required to lubricate the pickers is carried away by the severed clips in their passage out of the machine to the exhauster.

Fifteenth. In order to adjust and secure the pickers to the detachable plates (when these are used) or to the picker-carrying bars themselves, as used in the arrangement for narrow machines, we form the picker-supports (whether plates or bars) with a tongue projecting from a flat surface, and cut into the side of the picker shank a groove to correspond. The pickers at the end of the bar or support toward the center of the machine are made with two holes through the shank, and the supports are made with pins, which enter these holes in the end pickers. This gives the end picker an upright position and at the same time allows the next and succeeding pickers to be pushed up against it along the tongue. When the bar or plate is filled with pickers along its entire length, instead of terminating the line with a regular picker, a piece of steel of the same width and thickness as a picker is used, which instead of having its lower end cut into the form of a picker is rounded on its lower edge toward the side wall of the machine, the other corner being left square. This protects the point or toe of the picker adjacent to it, and prevents it from entering the net or fabric of the lace, serving the same purpose as the heel of the adjacent picker does to the point of the one nearest to it, and so on through the line of pickers. An eccentric or other suitable device is then used to compress the picker shanks together along the tongue until they form a solid mass at the shank. A plate or strip suitably supported is then placed over the shanks of the pickers and clamps are swung over it, which clamp the pickers against the flat face of the picker carrier, or support. The toe of the pickers being narrower than the shank, it follows that a space is left between the toe of each picker and the heel of the succeeding one in order to allow the floats or clips to rise between and be picked up and severed by the pickers. This arrangement allows of pickers of various widths, thickness and heights of toe to be used on the same picker carrying bars or plates and secures them in an accurate and substantial position.

Sixteenth. In former machines the acting end of the picker described, in its movement, an oval or ellipse, whose major axis was parallel with the lace plate. According to the present invention, the two eccentrics on each side of the center of lace-plate which impart the motion to the gangs of pickers, are so adjusted relatively to one another that the major axis of the ellipse on each side of the center of lace-plate is oblique to the lace-plate, and inclines downward toward the middle of the lace-plate. The object of this arrangement is to cause the pickers, as they move backward and downward, to act with greater certainty upon the floats or clips, which pass between the toes and heels of adjacent pickers and are caught upon the former. The motion of the pickers downward, to engage the floats or clips, is by this arrangement, more nearly vertical than heretofore, and consequently surer to effect the desired object.

Seventeenth. Instead of giving the upper surface of the toe of the picker an angle rising toward the cutting edge, as provided in our former patent, No. 361,563, we make this surface parallel in a transverse direction to the lower side or end of the picker. This makes the toe or nose of the picker parallel across its whole width, and allows the end to be nicely rounded in all directions toward the upper or cutting surfaces. Instead of twisting the toe of the picker so as to make the cutting edge approach the stationary blade nearer than at the heel, as provided in our previous patent, No. 361,563, we grind or lap the cutting side of the picker at a slight angle, not only to a vertical line but to a horizontal line through the center of the line of pickers. This makes the end of the picker narrower at the heel than at the toe and has the same effect, so far as the cutting edge is concerned, as twisting the picker, but is an improvement upon it, since it leaves the other side of the picker parallel to the grooves in the lace-plate.

Eighteenth. It being necessary to guide the lace accurately through the machine so as to have the selvage edges or the "backs" pass through the centers of the grooves or depressions made by the adjustable strips, we provide adjustable gages under which the lace passes as it enters the machine. Preferably we attach these gages by means of screws and nuts entering a T-groove cut in the face of the bar which is laid in grooves cut in the side walls of the machine. The upper surface of this bar is square and the cover when closed fits against it. The lower end of the bar is rounded and comes about even with the upper surface of the lace plate, and in order to allow the lace to pass freely, a rounded groove is cut in the lace plate under the bar. The gage points are bent partly around the front curved surface of the bar so as to approach the lace as nearly as possible. By this arrangement, while the lace passes freely into the machine, but little air passes in with it and the gage points are close to the lace.

Nineteenth. The clips or floats which have been severed by the cutting pickers as the lace passes under the gang of pickers are not only cut in two, but before they pass beyond the action of the pickers are cut again and again, which separates portions of the clips or floats entirely from the body of the lace. These severed portions of clips get in behind the pickers and between them and the bridges carrying the stationary blades, especially at the rows of pickers toward the front of the machine from which the lace is approaching. This is caused partly by the fact that the severed ends of the clips which are directed toward the rear of the machine naturally have a tendency as the lace is fed through the machine to push through between the pickers and upward against the inclined surface of the stationary knife bridges, where they remain after being severed from the lace, and partly by the action of the exhauster causing a current from the front to the rear of the machine which draws the severed portions of the clips with it, and in some cases leaves them behind the pickers. When the machine has been running a while it is necessary to stop it and with a pair of tweezers remove these severed clips which are packed in behind the rows of pickers. To obviate this difficulty we make the picker carrying bars or slides of such form that a current of air is drawn by the action of the exhauster from the outside of the machine between the stationary blade bridges and the rows of pickers, coming out between the pickers. The current of air so formed tends in a measure to prevent the clips from going in behind the pickers, and should they get there has a tendency to eject them again with the air current, when they would be at once carried upward and over the picker carrying bars or slides to the exit provided at the rear of the machine. As there is little or no tendency for the severed portions of the clips to get in behind the rear rows of pickers, or the pickers on the rear side of the bridges, the bridges and picker-carrying bars or sleeves are so formed that the current of air brought in through them is directed only toward the front rows of pickers. This at the same time prevents the current of air through the machine before referred to from passing between the pickers and compels all the air which enters the machine through the lace-plate from below, or the air brought in through the picker carrying bars or slides, from above, to pass upward and over the picker carrying bars or slides to the exit at the rear of the machine.

Figure 26:
Figure 3:
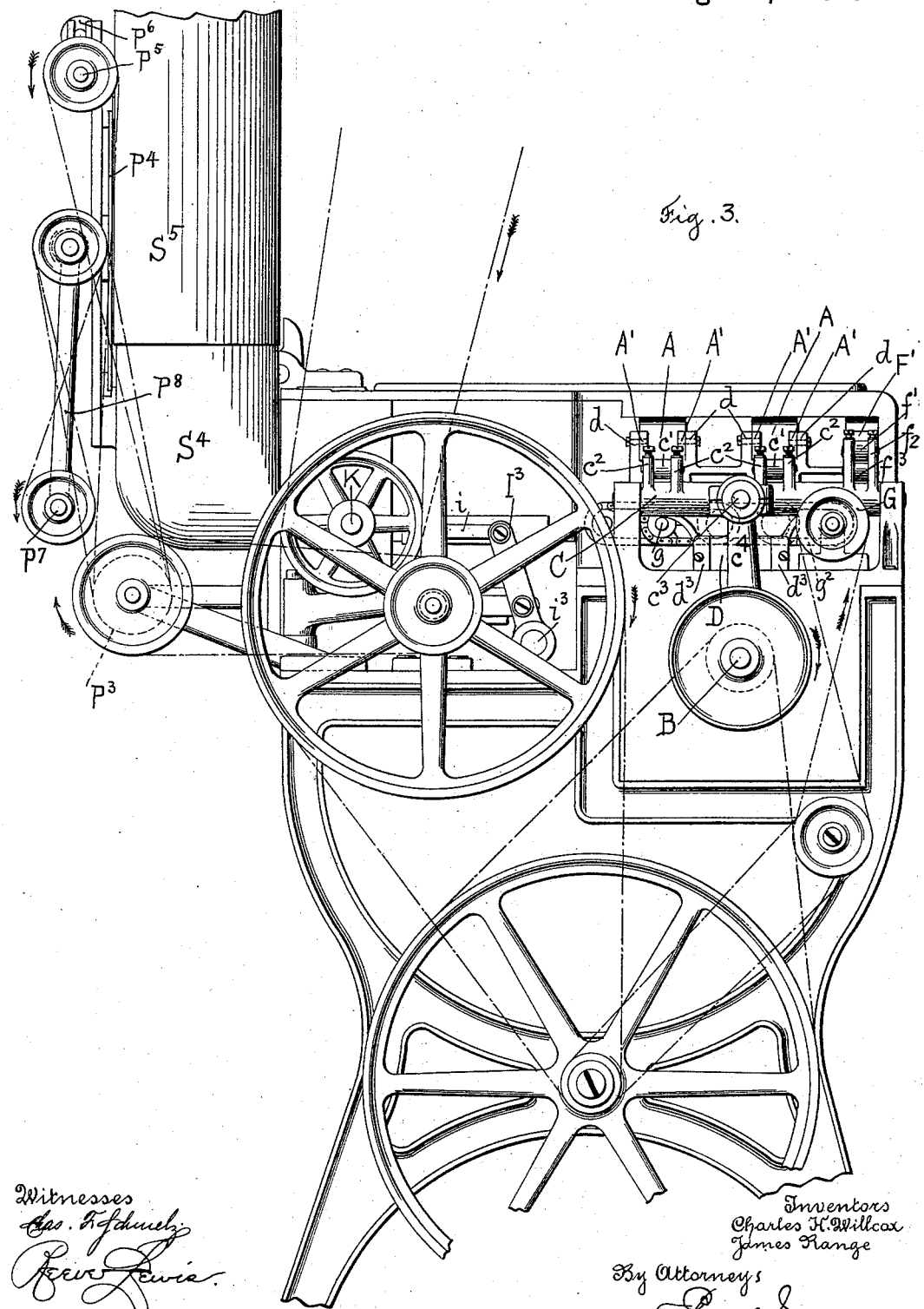
Figure 4:
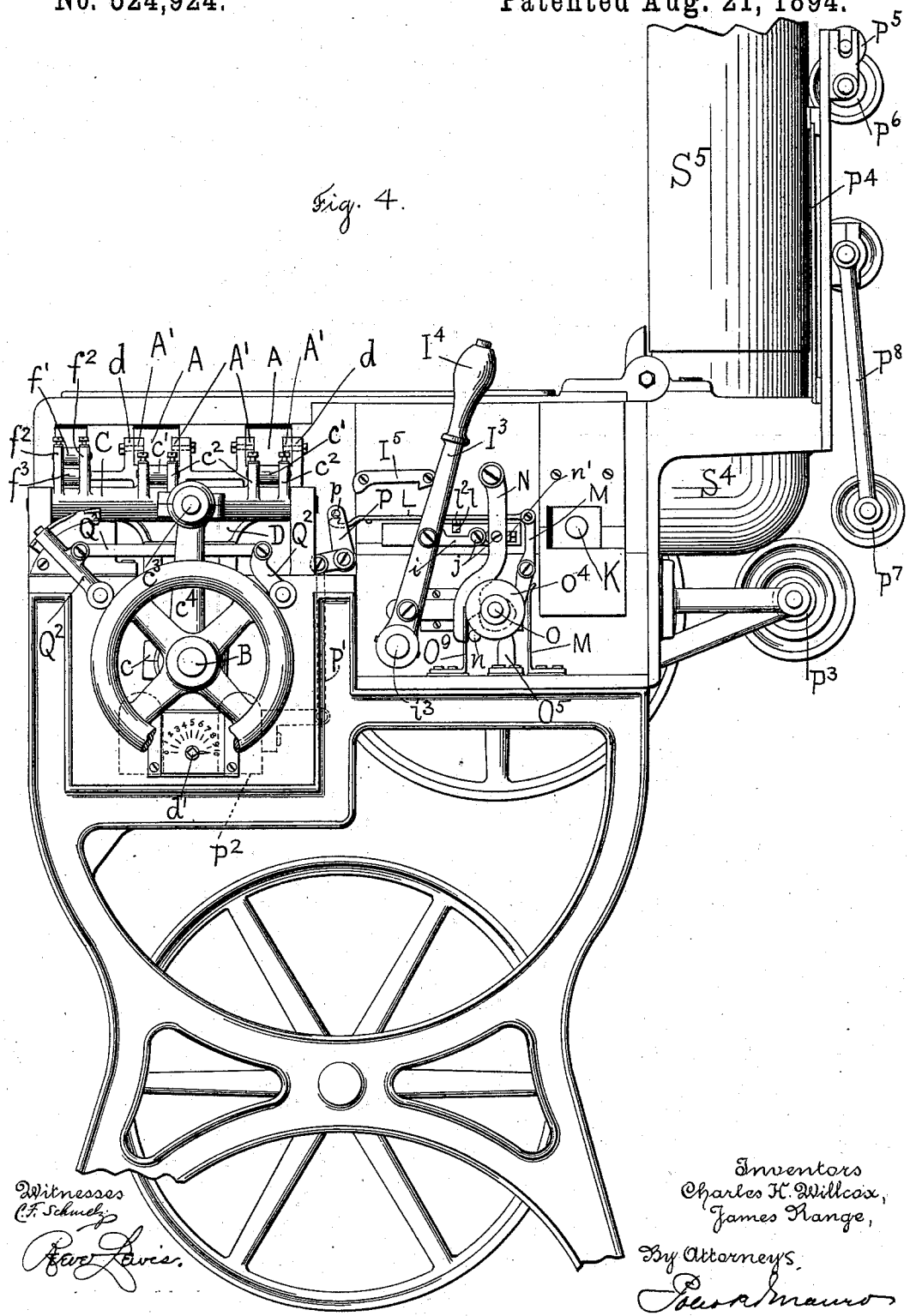

In the accompanying drawings which form part of the specification, Figure 1, is a plan view of a machine embodying the several improvements in the best form now known to us. Fig. 2, is a front elevation. Fig. 3, is an elevation of the left hand side. Fig. 4, is an elevation of the right hand side. Fig. 5, is a longitudinal section on line 5, Fig. 1. Figs. 6, 7 and 8 are transverse sections on lines 6, 7 and 8 (Fig. 5) respectively. Fig. 9, is an enlarged detail in section showing the construction of the pickers and accessory parts. Fig. 10 is a detail in elevation showing part of a gang of pickers. Figs. 10$^a$, 10$^b$ and 10$^c$ are detail views of the pickers. Fig. 11, is a plan view of the lace-plate. Figs. 12 and 13 are sectional views on lines 12 and 13 respectively (Fig. 11). Figs. 14, 15 and 16 are enlarged detail views illustrating the mowing mechanism and adjacent parts. Figs. 17, 18, 19, 20, 21, 22, 23, 24, and 25 are detail views illustrating the automatic mechanism for retracting the throat-plate. Fig. 26, is a detail view showing part of one of the toothed spreading rollers.

In the machine shown in the drawings there are two double rows of pickers $a$ (Fig. 5) extending practically across the entire machine, but each divided near the middle line of the machine into two sets, working in opposite directions, as in Letters-Patent No. 361,563, above referred to. The pickers are carried by slides or sleeves A, which are mounted and slide upon cross-bars A′ extending entirely across the machine. As seen in Fig. 9, there is a pair of cross-bars for each double row of pickers. Cross-bars A′ have a vertical movement derived from eccentrics $b$ (Fig. 8) on the main shaft, while the horizontal movement of the slides or sleeves A is derived from eccentrics on the ends of the main shaft encircled by the straps $c$ (Figs. 6, 7 and 8). Consequently the pickers $a$ move in an elliptical path which is the resultant of these two movements, and as already explained the eccentrics are so placed relatively to each other that the major axis of the ellipse is inclined downwardly toward the middle of the lace-plate (Fig. 10$^a$).

The cross-bars A′ are attached by bolts or screws to the upwardly projecting arms $d$ of vertical slides D (Figs. 3 and 4) one on each side of the machine, which are at their lower ends attached to the horizontal rod $d'$. The latter receives a vertical movement from the connection rod $b'$ actuated by eccentrics $b$. The slides D are guided and held in place by the upright bars or guide-blocks D′ (Fig. 8) rigidly attached to a portion of the frame of the machine. The slides are held upon these blocks by lateral flanges $d^2$ and gibs $d^3$ overlapping the faces of the blocks as shown in Fig. 1.

The picker-slides A are at their outer ends attached by means of short links $c'$ (Fig. 8) to the vertical arms $c^2$ of the rock shaft C, which is oscillated by the connection-rod $c^4$ through a ball and socket connection, at the end of pin $c^3$.

Any suitable means for imparting the proper movements to the supporting-bars and picker-slides may be employed in place of those described.

Each gang of pickers is preferably carried by a holding plate E (Figs. 9 and 10) detachably secured to the slide A by screw-bolts $e$. The picker plate E has a small longitudinal tongue $e'$, and in the shank of each picker is cut a corresponding groove.

In assembling a gang of pickers, the end picker toward the center of the machine (Fig. 10) has two holes $a^3$ into which fit corresponding pins projecting from the support or plate. This fixes the first picker in an upright position, and determines the positions of all the others which are fitted upon tongue $e'$ and arranged in close contact along the entire plate. When the holding plate is thus filled with pickers, a steel bar $a^4$ is placed in the position which would be occupied by the last picker, which bar acts as a guard to the toe or point of the picker adjacent to it. This bar has on its outer face a pin $a^5$ which fits in a groove in one end of guard-plate or strip E′, which is placed over the shanks of the entire line of pickers, and held in position by clamps E$^2$. The outer end of strip E′ is similarly supported by one of the pins which hold the end picker.

When the pickers are set in place along the tongue $e'$, an eccentric E$^3$, having a milled surface for turning, is used to compress the entire line, and when this is done the position of the eccentric and of all the pickers is fixed by means of a lock-nut E$^4$. This method of mounting the pickers is useful whether they are carried by a detachable holding plate, as shown, or attached directly to the bars or slides, as heretofore. The pickers are set closer together, permitting the use of a larger number than when a separate socket for each shank is formed in the picker-support. The mounting moreover is simple and efficient and admits of the ready removal of any individual picker, or of the entire gang, as occasion may require.

As shown in Figs. 1 and 5 there is, in addition to the two pairs of picker-supporting cross-bars, a single cross-bar A′, between them and the front of the machine, which is similarly connected to and moved by the slides D. This single cross-bar carries the brushes $f$, which act upon the lace in advance of the pickers. The function of these brushes is primarily to loosen the picks or floats, which as the lace is received for picking, are stuck to the groundwork of the fabric. They also act to spread or stretch the lace laterally and thus prepare it for the action of the pickers. These brushes $f$ (Figs. 5, 6 and 7) are carried by sleeves or slides, mounted on bar A′ and move in the same manner as the pickers themselves, that is, they brush from the center toward the sides of the machine.

The brushes are arranged in a double row, and each row is composed of four separate gangs or sets (though the number may be greater or less). Each gang or set is carried by a holding plate F′, F$^2$, &c., secured to its slide by bolts, so as to be adjustable vertically. The slides carrying the outer sets F′, F$^4$ are attached by short links $f'$ to the vertical arms $f^2$ of rock-shaft C, and the intermediate sets F$^2$, F$^3$ are attached by links $f^3$ to the same arms $f^2$, but at points nearer to the axis of the rock-shaft C. Consequently the brushes at the sides of the machine have a larger movement than those near the middle, and the lace is thereby effectually brushed and spread over the entire surface.

Just inside the cover and in front of the brushes is a vertically acting clamp $f^4$ (Figs. 5 and 6) preferably having a strip of rubber let into its lower edge. This clamp is carried by vertical pins $f^5$, which are normally pressed downward by springs $f^6$. When the pickers rise, however, the clamp is also lifted by arms $f^7$ carried by slide D, which come in contact with the lower ends of pins $f^5$. The function of this clamp is to assist in holding the lace while acted upon by the brushes, so as to prevent the lace from being pulled by the brushes to one side or the other of the proper line of feed.

Between the two lines or rows of brushes is a roller $F^5$ (Figs. 5 and 7) which rests upon the lace. In the periphery of this roller are cut ratchet-shaped grooves, the vertical faces of these grooves at each side being turned away from the center of the machine. Consequently, as the brushes rise after brushing and stretching the lace, the teeth of the roller engage the surface of the lace and keep it extended.

As shown in Fig. 5, the lace plate is grooved transversely beneath the roller, so as to extend the surface of contact between the latter and the lace. The journal pins (Fig. 7) of this roller are guided vertically in slots $f^9$ in the side frames of the machine, which slots extend downwardly a slight distance below the journal-pins when the roller is resting on the lace plate; so that when the lace plate is lowered, to insert lace into the machine, the roller remains suspended.

In its continued progress through the machine the lace passes under a series of rollers $g$ (Figs. 1, 5 and 8) five of which are employed in the machine illustrated in the drawings. These rollers are cut on one or both sides of the center with spiral threads forming grooves whose vertical faces are turned away from the center toward the outside of the machine. Their function is to continue the spreading action upon the lace during the whole time it is being acted upon by the pickers. These rollers are rotated positively in such direction that the under surface in contact with the lace moves in the opposite direction to the travel of the latter. This movement is derived from a pulley G (Figs. 1, 3 and 6) on the shaft of one of the rollers. This shaft also carries a sprocket-wheel $g'$ (Fig. 6) which transmits motion by a drive chain $g^2$ (Fig. 1) to the next of the series of rollers, and by similar gearing the motion is transmitted to the entire series. In some cases it is desirable to give these rollers a slight vertical movement opposite to that of the pickers, so that when the latter descend the rollers will rise, and vice versa, thus alternately drawing more lace through the machine and giving it up as the pickers descend upon it, after the manner of the take-up rollers described in our former patent, No. 361,563. This action relieves the lace of undue strain caused by the pickers depressing it into the grooves of the lace-plate. To this end the three intermediate rollers $g$ are journaled in plates $G^4$ (Fig. 5), recessed into the side walls of the machine and having a slight vertical play therein. These bars are supported by upright rods $g^3$, having bearings in brackets $G'$, and reciprocated through a bell-crank $g^4$ and connection-rod $g^5$ from an eccentric on the main-shaft. Inasmuch as it is not always necessary or desirable to impart this movement to the rollers, the actuating eccentric is usually provided with well known means for setting it concentric with the shaft.

The best form of the rollers $g$ will also depend upon the particular character of the lace which is being acted upon. In some patterns there is a "head" composed of thick threads at one edge of the lace while at the other there is little but the net or ground work, and in this case it is not desirable to employ spiral or spreading threads on that part of the rollers which act upon the head, but simply to hold it against the drawing action of the spiral part of the roll. In other words, the particular rollers used must be adapted to the work to be done, the object being always to equalize the spreading action.

The rollers $g$, as shown, work in grooves or depressions in the lace plate, so as to give the rollers a sufficient surface in contact with the lace to act properly upon it.

It is found desirable to arrange a tension device to act upon the lace between the picker mechanism and the mowing mechanism, so as to cause the lace to bend sharply over the edge of the throat plate. As shown this tension device consists of a roller $G^2$ (Fig. 5) of proper weight. The journal pins $G^3$ of this tension roller (Fig. 1) turn in vertical grooves in the side walls of the machine. The application of a tension device between the pickers and mowing mechanism is important for the reason already pointed out.

The throat plate over which the lace is bent while the rotating mower or cutter K removes the severed clips is as shown, composed of a plate or strip H (Fig. 14) set between two clamping jaws $H'$, $H^2$, held together by screws $H^3$, the upper jaw $H'$ being attached to the throat plate holder I, by screws $H^4$. The holder I rests normally on a projection $I'$ of the frame (Fig. 5) and is supported at each side by a slide $I^2$ which fits in a slot in the frame, and is attached by a link $i$ to an upright lever $I^3$.

The lever $I^3$ on the right-hand side of the machine (Fig. 4) has a handle $I^4$, by which the throat-plate is drawn back during the insertion of a piece of lace into the machine.

A detent $I^5$ with two hooks one at each end is attached to the side of the machine in position to engage a spring catch $I^6$ (Figs. 17 and 18) on the lever $I^3$ so that the lever may be held back a short distance by the first hook or catch and a greater distance by the second hook.

A spiral spring $i^2$ on the shaft $i^3$ to which levers $I^3$ are attached (Fig. 18) normally holds the lever in the position shown in Figs. 14 and 17, that is, so that the throat-plate occupies its forward position.

When one of the seams by which the pieces of lace are held together passes over the edge of the throat-plate H, it is necessary that the latter be retracted a distance sufficient to avoid the cutting of the lace by the blades of the mower. To accomplish this we provide mechanism for drawing back the throat-plate and its holder at the proper moment, which mechanism is put into operation by a "setting-off" device, the latter being automatically actuated as a seam or extra-thickness approaches the edge of the throat-plate.

Referring to Fig. 5, it will be seen that the lace, before reaching the throat-plate, passes between two rods $m$, $m'$ connected together at their ends by oblong plates $m^2$. Rod $m$ is journaled in holes $m^3$ (Fig. 14) in the throat-plate holder I, so that the whole device can turn on the axis of rod $m$. The "setting-off" device is a transversely arranged lever $l$ (Figs. 1, 5 and 18) pivoted at $l'$ to the back of the holder I. The inner end of this lever lies just beneath the lace under rod $m'$, but not necessarily in contact therewith. The outer end of lever $l$ is just beneath a link or arm L (Figs. 17, 24 and 25) pivoted at one end to the vertical releasing-lever M.

A screw $l^2$ is interposed between the arm L and the lever $l$, and screwed into the latter. By means of this screw the proximity of the inner end of lever $l$ to the lace passing above it can be regulated to a nicety.

A pivoted arm N hangs vertically from the frame, resting at its lower end against a stop pin $n$, by which its movement in one direction is limited. This arm carries an adjustable pin $n'$ against which rests a link $i$ carried by the pin $j$, which connects link $i$ with the throat-plate holder I. Pin $n'$ therefore determines the proximity of the throat-plate H to the mower K. Obviously, the movement of the arm N to the left (Fig. 17) will move the holder I and throat-plate in the same direction. This desired movement is derived from a cam O (Figs. 20 and 21) on a shaft O', which is the continuously rotating shaft of one of the feed rollers $O^2$. The hub of cam O is loosely mounted on said shaft, but can slide thereon. It carries a disk $O^3$ having on one face a projecting pin $o$ adjacent to which is a disk $O^4$ having a series of holes $o'$, disk $O^4$ being pinned on and turning with the shaft. These two disks constitute a clutch. Cam O is constantly pressed in a direction to bring the two members of the clutch together by means of a spring $O^5$, but such engagement is normally prevented by the end of the release-lever M, which is pressed by spring M' into the groove, formed between disk $O^3$, and the edge of a disengaging cam $O^6$.

Near the free end of the arm L is a bell-crank lever P, which is constantly vibrated by means of a link P' from the counterweight $P^2$, (see Fig. 4,) or it may be from some other moving part.

Figure 24:
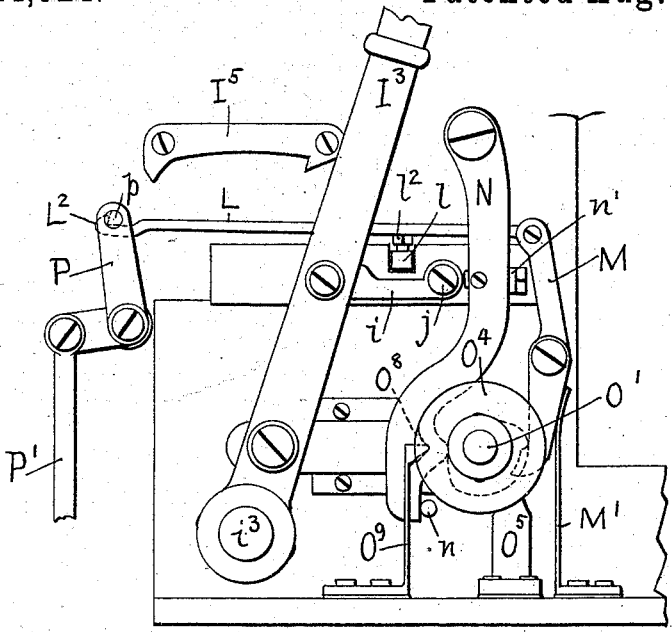

The vertical arm of lever P carries a pin catch $p$, whose edge vibrates back and forth just above and clear of the hook $L^2$ on the end of arm L. When a seam or joint of two pieces of lace passes over the inner end of the setting-off lever $l$, depressing it slightly, the outer end $l^2$ lifts arm L a sufficient distance to bring the hook $L^2$ into the path of catch $p$ (as shown in Fig. 24). This instantly sets off the drawback mechanism for the throat-plate, since the vibration of lever P actuates release-lever M through arm L, freeing the sleeve which carries cam O, and permitting spring $O^5$ to move the sleeve with its cam and clutch-disk to the left (Fig. 18) until pin $o$ enters one of the holes $o'$, and all the parts connected with disk $O^3$ begin to revolve, and continue to revolve for one full revolution of feed roll $O^2$. When release-lever M returns at the next vibration of lever P, its end strikes and is arrested by the edge of cam $O^6$, which has now moved under it.

The setting-off lever acts a certain time before the seam actually reaches the edge of the throat-plate, but the drawing back of the latter does not begin at once, for by reference to Fig. 17, it will be seen that the shaft of feed-roller $O^2$ turns through a considerable portion of a revolution before cam O begins to act on arm N.

Figure 25:
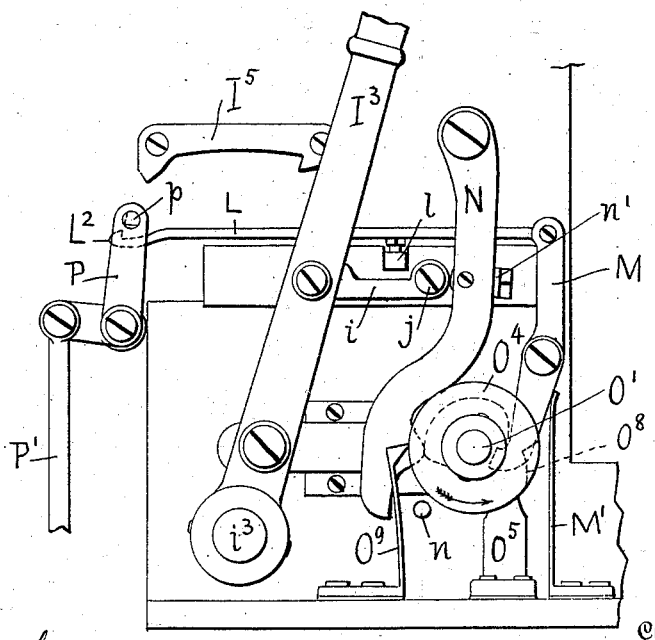

Fig. 25 shows the positions of the parts after cam O has engaged and pushed back arm N to the full extent, and the throat plate being now open remains open, until the cam has passed projecting point of arm N, against which it bears, when through the action of spring $i^2$ (Fig. 18) the shaft $i^3$ with its levers $I^3$, throat plate holder, and all connected parts, are returned to their original positions.

As the actuating cam continues to revolve with the feed-roller and its shaft, provision must be made to disengage and arrest it at the completion of one revolution. This is effected mainly by the action of the disengaging cam $O^6$. This extends only part way around the sleeve or hub, permitting the end of release-lever M to fall into its groove. It will be understood, of course, that the hook L becomes disengaged and returns to its first position so soon as the seam has passed the inner end of the setting-off lever $l$.

When cam O has passed arm N and allowed the throat plate to return, the oblique side $O^7$ of cam $O^6$ (Fig. 20) makes contact with the edge of release-lever M and by the continued revolution of the cam this contact of the said oblique side with lever M, causes the sleeve to slide to the right so far as to withdraw the pin $o$ from the hole in disk $O^4$ in which it engaged. This movement has brought the notch $O^8$ in the edge of disk $O^3$ to the wedge shaped end of spring $O^9$ (Fig. 17) which gives the final movement to disk $O^3$ so as to clear the pin $o$ entirely from contact with the face of disk $O^4$, and to arrest the cam-sleeve just at the completion of one movement.

Since the actuating cam O derives its movement from the feed roll $O^2$, it is only necessary in order to time accurately the action of the drawback mechanism, that the cam O should be arrested, at a determined distance from the arm N, that is to say, about the distance between the setting-off lever and the edge of the throat-plate.

The lace after being mowed passes down between the feed-rollers $O^2 O^{10}$ (Fig. 5) thence under the block in which the mower K is journaled and thence vertically upward around a guide roller $P^3$ in front of a display plate $P^4$, either white or colored, as best adapted to exhibit the pattern of the lace, and permit inspection by the operator. The lace is drawn upward over the display plate by the feed-rollers $P^5$, $P^6$ and finally passes over a roller $P^7$ to a basket or receptacle placed to receive it. In action the arms $P^8$ by which roller $P^7$ is carried, may be extended horizontally, so as to prevent silk lace being drawn by electrical action against the frame of the machine and all these rollers may be rotated in the proper direction by belts and pulleys as shown in Fig. 3.

The lace plate Q (Figs. 5, 7, 11, 12 and 13) is adjustably supported on cams $Q'$, whose shafts are connected together by arms $Q^2$ and link $Q^3$ (Fig. 4), so that the lace plate can be lowered or adjusted as desired, substantially as described in our former patent, No. 361,503.

The improvements in the lace plate are best shown in Figs. 11, 12 and 13, and consist principally in means for preventing the "back" or selvage of the lace from being picked up and cut by the pickers, which means can be adapted or changed to suit different varieties of lace.

As shown in the drawings the upper surface of the lace plate, upon which the lace rests when acted upon by the pickers, is formed by a series of transverse strips or bars $q$ adjustably and removably attached to the lace-plate by nuts $q'$ fitted into T-grooves in the top of the lace-plate, and holding screws $q^2$. The effect of these strips is practically to make channels, grooves or depressions extending across the lace-plate in the direction in which the lace travels. Such a groove, channel or depression $Q^5$ is shown in Figs. 11 and 12, extending across the middle of the plate, and if a back or selvage passes through the machine coincident with this groove or channel, it will be drawn by the rollers $g$ sufficiently below the level of the main portion of the lace to avoid the points of the pickers.

It is proposed to supply with each machine several sets of strips of different lengths so that provision may be made to vary the number, width and relative positions of the longitudinal depressions or channels.

With respect to the selvage or selvages which lie at the extreme edges of the breadth of lace, while it is desirable to depress them out of the way of accidental cutting from the pickers, it is also desirable to have the spiral ratchet rollers $g$ continue their spreading action to the extreme outside edges of such selvages. For this purpose, provision must be made to depress the lace beneath the general upper surface of the strips $q$ on the edges of such strips which constitute the picker grooves, and to keep it raised to the normal surface at the edges adjacent to the rollers. This we effect by beveling the ends of the strips $q$ toward the picker grooves and arranging above these beveled ends guiding fingers $q^6$ having their under surfaces inclined downward toward the picker grooves, so as to hold the back or selvage safely below the points of the end pickers.

The guiding fingers $q^6$ are attached to the lace plate in the same manner as the strips $q$ and are likewise adjustable.

The removable throat-plate H (Figs. 14 and 16) has a row of perforations $h$ through which air is drawn into the exhaust duct or pipe. The currents of air passing through these holes assist in lifting the floats, and causing them to stand out properly for the action of the mower. The plate H also has an indented or cut-away portion $h'$ (Fig. 16) and that part of the lace which comes opposite this cut-away portion of the plate will be held farther away from the cutter than the surface of the rest of the lace. This indentation is intended to accommodate the thick pattern of the lace, and of course, its position and width must be varied with the different kinds of lace. On this account the ability to quickly remove and change the throat plate is a matter of importance.

To further insure protection of the pattern from the blades of the mower we have combined with the throat plate a guard, shown in the form of a section of a comb $h^3$, whose teeth extend to a point opposite the indentation in the throat-plate, and effectually hold that portion of the lace out of the way of the cutter blades. The width of the comb, or guard used with any pattern of lace will correspond with that of the indentations in the throat-plate, and if there be more than one such indentation there must be several comb-sections or guards, properly placed. To this end the comb-slide $h^4$ is removably and adjustably mounted on a bar $h^5$ extending across the machine, and secured thereto by a screw $h^6$ and nut $h^7$, the latter sliding in a T-groove in the bar $h^5$ (Fig. 14).

In order that the pattern may register properly with the indentations of the throat-plate, and the backs or selvages with the depressions formed by the adjustable surface strips of the lace-plate, it is necessary to guide the lace accurately into the machine. To assist the operator in this we provide adjustable gages just above the opening through which the lace passes into the machine. One of these gages R is shown in Figs. 2 and 5. It is adapted, by means of a screw and nut, to slide in a T-groove $r$, of a bar $R'$, which extends across the front of the machine. The lower surface of the bar is rounded and extends into a groove in the lace plate beneath it, so as to be slightly below the upper surface of said plate, and thus exclude air at this point, so far as possible.

The pickers in their operation co-operate, as heretofore, with stationary blades S (Fig. 9) which are supported by bridges S' overhanging the lace-plate. Where the pickers bear against the stationary blades it is necessary that a small quantity of oil be constantly supplied. For this purpose an oil reservoir is formed in the upper part of the bridge (or there may be several such reservoirs) and from this reservoir oil is conveyed by ducts $s'$ to the upper inclined surfaces of the blades where these bear against the under surfaces of the bridges. Between these two surfaces sufficient oil will escape to lubricate the pickers, but not enough to drip upon and soil the lace. Any excess of oil will be taken up and carried away by the several floats in their passage out of the machine.

The clips or floats in passing under the pickers are not only severed thereby, but are cut again and again, so that portions thereof become completely detached. It is desirable to prevent these loose threads getting in behind the pickers and accumulating between them and the bridges S'. The action of the exhauster heretofore tended to draw the severed floats in between the shanks of the pickers. To obviate the inconvenience above noted we now cause currents of air to pass from between the pickers outwardly so that the entrance of clips between the pickers is opposed, and any that may find admission are ejected, by the air currents.

Currents of air from outside the machine are drawn in by the exhauster through vertical flues $S^2$ (Figs. 8 and 9) passing down through the picker-slides A and terminating just above bridges S'. Since there is little or no tendency for severed clips to enter behind the rear line of the double row of pickers, the picker-slide on this side is caused to bear against the bridge, so as to close the outlet on that side and divert the air current toward the opposite side of the bridge. To further guide the air currents between the pickers of the front row, the opening at each end of the row of pickers is partly closed by a plate $S^3$ (Fig. 9) attached to the picker-slide.

After escaping between the shanks of the pickers, the air carrying the loose clips is drawn upwardly over the picker-carrying slides, and rearwardly through the free space just beneath the cover (as indicated by the arrows Fig. 5). After passing the pickers the air is drawn between the mower and throat-plate into the horizontal duct $S^4$, and out of the machine by the upright pipe $S^5$, with which the exhauster is connected.

The construction of the pickers $a$ (Figs. 10, $10^a$, $10^b$, $10^c$) has been somewhat modified and improved. The upper surface of the toe $a'$, was formerly inclined upward in a transverse direction, toward the cutting edge. We now make the surface so that all transverse lines are parallel with the under surface of the toe, in order that the end of the latter can be properly rounded in all directions toward the upper surface.

Heretofore the toe of the picker was twisted or deflected, so as to make the cutting edge approach the stationary blade nearer than the heel. We now grind or lap the cutting side $a^2$ of the pickers at a slight angle horizontally, making the picker narrower at the heel than at the toe, (as shown in Fig. $10^b$) and also at an angle vertically (as shown in Fig. $10^c$) making the toe narrower across its under surface than across its upper surface. This construction has the same effect so far as concerns the cutting action, as twisting the pickers, but it leaves the other side $a^3$ of the toe parallel with the picker groove, which is an advantage.

The counterweight $P^2$ (Figs. 5, 6, 7 and 8) is operated substantially as in our former patent. It is carried by a rod T supported and balanced by springs $t$ (Fig. 8) and is reciprocated in opposition to the movement of the picker-supports by connection rods $T^2$ from eccentrics T' of main shaft B. The rod $d'$ which communicates motion to the picker-carrying bars is also balanced by springs $T^3$. It is adjustable and is provided with an indicator (see Fig. 4) as in the patent last referred to. The band pulley and flywheel on the main shaft B are the same as shown in said patent.

Except in the particulars herein pointed out, the machine is substantially similar in construction and operation to that described in our former patent, No. 361,563, and it will therefore be unnecessary to explain further its mode of operation.

What we claim, and desire to secure by Letters Patent, is—

1. The combination with the lace-plate, of picker-carrying slides or sleeves, cross-bars upon which said slides or sleeves are mounted, means for reciprocating said slides or sleeves horizontally, and means for reciprocating said bars vertically, substantially as described.

2. The combination with a lace plate, of a bar extending entirely across said lace-plate, vertical slides supporting each one end of said bar, picker-carrying slides or sleeves supported by said bar, and extending respectively from opposite sides of the lace-plate toward the center thereof, and means for reciprocating said slides or sleeves, in opposite directions, substantially as described.

3. The combination with the lace plate, of the cutting-pickers, supports therefor, and mechanism for moving said pickers in an elliptical path whose major axis is inclined toward the lace-plate, substantially as described.

4. The combination with the pickers, of supporting and actuating mechanism therefor, comprising cross-bars extending over the lace-plate, vertical slides to which the ends of said bars are attached, means for reciprocating said slides, horizontal sleeves or slides carrying the pickers and mounted on said cross-bars, and means for reciprocating said sleeves or slides, substantially as described.

5. The combination with the picker-supports, of a gang of pickers fitted thereto by a tongue and groove connection and arranged in a continuous line with the shanks of adjacent pickers in contact, substantially as described.

6. The combination with a picker-support, of a row of pickers arranged in a continuous line with the shanks of adjacent pickers in contact, and clamped together upon said support, substantially as described.

7. The combination with a picker-support, having a tongue projecting from the surface thereof, of a row of pickers having each a groove fitting said tongue, fastening devices such as pins, for holding the end picker in place, and a clamping eccentric for compressing the row of pickers closely together, substantially as described.

8. The combination with the reciprocatory picker-support, of a picker-holding plate, means such as screw bolts detachably securing said plate to said support, a gang of pickers, and clamping devices detachably securing said pickers to said plate, substantially as described.

9. The improved cutting picker for lace clipping machines, said picker having the upper surface of its toe-portion parallel in a transverse direction with the under surface, substantially as described.

10. The improved cutting picker, having its cutting side inclined at an angle horizontally and vertically, so that the picker is narrower across its under surface than across its upper surface and wider at the toe than at the heel, substantially as described.

11. The combination with the lace plate and picker-mechanism, of a series of brushes extending across the lace plate in advance of the picker-mechanism, and means for reciprocating said brushes, substantially as described.

12. The combination with the lace-plate and picker-mechanism of brushes, extending across the lace-plate in advance of the picker-mechanism, the brushes being divided near the middle of the lace plate into two sets, and means for operating the brushes so that they brush and stretch the lace toward the edges thereof, substantially as described.

13. The combination with the lace-plate and pickers, and with mechanism for reciprocating the pickers horizontally and vertically, of a series of brushes extending across the lace-plate and mechanism for moving the brushes in unison with the pickers, substantially as described.

14. The combination with the lace-plate and picker mechanism of brushes extending transversely across the lace-plate, for brushing the lace from the middle toward the edges of said plate, and operating mechanism for imparting to the brushes near the edges of the plate a longer movement than that of the intermediate brushes, substantially as described.

15. The combination with the brushes and mechanism for reciprocating the brushes transversely to the lace-plate, of a serrated roller, resting in action upon the lace adjacent to the brushes, substantially as described.

16. The combination with two lines of reciprocating brushes, of a roller having ratchet-shaped teeth resting upon the lace between the two lines of brushes, substantially as described.

17. The combination with the transversely and vertically reciprocating brushes, of a clamp bearing upon the lace in advance of the brushes, and means for lifting the clamp when the brushes rise, substantially as described.

18. The combination with the lace-plate, pickers and feed-mechanism, of the spreading rollers, removably supported above the lace-plate, said rollers having screw-threads for spreading the lace from the center toward one or both ends, and means for rotating said rollers in opposition to the movement of the feed, substantially as described.

19. The combination with the lace-plate, pickers and feed-mechanism, of spreading-rollers having ratchet-shaped screw-threads, vertically reciprocating supports for said rollers, means for moving said supports in a direction opposite to the movement of the pickers, and means for rotating said rollers, substantially as described.

20. The combination with the lace plate having transverse grooves, of a row of cutting pickers, operating to depress the lace into one of said grooves and engage under the picks or floats, and a spreading roller having ratchet shaped teeth supported in another groove of the lace plate adjacent to the row of pickers and parallel therewith, substantially as described.

21. The combination with the grooved lace-plate, of rows of pickers, and a series of spreading rollers having spiral ratchet-shaped threads alternating with the rows of pickers, substantially as described.

22. The combination with the picker-mechanism the mowing mechanism and the feed-mechanism, of a tension device exerting constant tension upon the lace between the picker-mechanism and mowing mechanism, substantially as described.

23. The combination with the lace-plate, picker-mechanism, mowing-mechanism and feed-mechanism, of a tension-roller, exerting constant pressure upon the lace between the mowing mechanism and picker-mechanism, substantially as described.

24. The combination with the rotary cutter and movable throat-plate, of mechanism for drawing back the throat-plate and returning it to its normal position, and a setting-off device or lever actuated by contact with a seam or extra thickness of fabric, for setting said mechanism into operation, substantially as described.

25. The combination with the rotary cutter, movable throat-plate, and feed-rolls, of a cam loosely mounted on the shaft of one of said feed-rollers, clutch mechanism for engaging said cam with said shaft, a release lever normally holding said cam disengaged, a spring acting in opposition to said lever, a setting-off lever actuated by contact with a seam for effecting the withdrawal of said release lever and the consequent engagement of said cam with said shaft, connections between said cam and throat-plate whereby the latter is withdrawn by the former, and means for disengaging and arresting said cam at the end of a revolution, substantially as described.

26. The combination with the rotary cutter, of a throat-plate support, and a throat-plate consisting of a thin bar or strip having a portion cut away for the purpose specified and being removably secured in said support, substantially as described.

27. The combination with the rotary cutter and the air-suction or exhaust pipe in the rear thereof, of a throat plate having perforations along the edge for passage of air, substantially as described.

28. The combination with the rotary cutter, of a throat-plate having its edge indented or cut away for passage of the pattern, substantially as described.

29. The combination with the rotary cutter, and indented throat-plate, of a guard opposite the indented portion of the throat-plate, substantially as described.

30. The combination with the rotary cutter and indented throat-plate, of a guard in the form of a comb opposite the indented part of the throat-plate, substantially as described.

31. The combination with the rotary cutter, and indented throat-plate, of a guard adapted to press the fabric toward said plate, said guard being adjustable lengthwise of said throat-plate, substantially as described.

32. The combination with the pickers, of the lace plate, having a longitudinal depression, groove or channel running in the direction of the feed of the fabric, substantially as and for the purpose set forth.

33. The combination with the pickers, of the lace-plate having adjustable and removable surface-strips, substantially as described.

34. The combination with the pickers, of the lace plate, and surface-strips adjustable transversely of said lace plate to form longitudinal depressions, grooves or channels of varying number and width longitudinally of said lace plate, substantially as described.

35. The combination with the pickers, of the lace-plate, and surface strips forming picker-grooves transversely of said plate, and extending from each side part way across the plate, forming a groove or grooves lengthwise of said plate, substantially as described.

36. The combination of the lace-plate provided with adjustable surface-strips, the pickers working in grooves formed between said strips, and the rollers working in other grooves between said strips and acting to depress the lace where the same is not supported by said strips, substantially as described.

37. The combination with the pickers and ratchet-rollers, of the lace-plate having surface strips forming ridges between which the pickers and rollers respectively operate, said ridges being at the ends beveled off from the roller side of the ridge toward the picker side, and guiding fingers for depressing the edge of the lace away from the pickers, substantially as described.

38. The combination with the lace-plate having transverse picker-grooves, and longitudinal intersecting grooves or depressions for the protection of the back or selvage edges of the lace, of the pickers and their actuating mechanism, and the spreading and depression rollers working in grooves of the lace-plate parallel with the picker-grooves, substantially as described.

39. The combination with the picker-mechanism, and the spreading rollers parallel with the rows of pickers, of a lace-plate and adjustable surface strips therefor, forming between them grooves for the pickers, and rollers respectively, said strips having straight vertical edges on the picker-groove side, and rounded edges on the opposite side, substantially as described.

40. In combination with the feed-mechanism, picker-mechanism and the indented throat plate, of a gage or indicator adjustable across the front of the machine above where the lace enters, to guide the feeding of the lace into the machine, substantially as and for the purpose set forth.

41. The combination with the reciprocatory pickers, of the cooperating stationary blades, and supports therefor containing oil reservoirs and ducts leading from said reservoirs through the support to the surface against which the said blades bear, substantially as described.

42. The combination with the reciprocatory pickers, of bridges or supports, and stationary blades secured in an inclined position against the under surfaces of said bridges or supports, the latter being provided with oil reservoirs and ducts leading to said blades, substantially as described.

43. The combination with the lace-plate and with a row of pickers, of pipes or flues, for conveying currents of air behind said pickers, and through the spaces between the several pickers, substantially as described.

44. In a lace clipping machine, the combination of the lace-plate, a double row of pickers above the lace-plate, a cover inclosing the pickers and forming an air passage above the same from the front to the rear of the machine, an exhaust or discharge pipe to which said passage leads, and air inlets between the two lines of pickers, directing currents of air through the front line of pickers, the exit of air through the rear line of pickers being prevented, substantially as described.

In testimony whereof we have signed this specification in the presence of two subscribing witnesses.

CHAS. H. WILLCOX.
    JAMES RANGE.

Witnesses:
 GILMAN E. JOPP,
 CURTIS E. HILL.